UNITED STATES PATENT OFFICE.

EDWARD C. GAVIN, OF BRISTOL, RHODE ISLAND, ASSIGNOR OF ONE-HALF TO AUGUSTUS O. BOURN, OF BRISTOL, RHODE ISLAND.

MANUFACTURE OF RUBBER SHOES.

983,819.  
Specification of Letters Patent.  
Patented Feb. 7, 1911.

No Drawing. Application filed May 10, 1906. Serial No. 316,193.

*To all whom it may concern:*

Be it known that I, EDWARD C. GAVIN, a citizen of the United States, residing at Bristol, in the county of Bristol and State of Rhode Island, have invented certain new and useful Improvements in the Manufacture of Rubber Shoes, of which the following is a specification.

My invention relates to the manufacture of rubber shoes in molds, and means whereby to produce the article without forcing the rubber coating unduly into or through the interstices of the fabric to which the coating is applied. In the ordinary manufacture of such rubber shoes it is common to cut a fabric coated with a vulcanizable coating into sections, which latter are assembled properly within a mold, and pressure is applied to force the sections against the mold. This pressure is generally heavy, and is very apt to force the rubber into the interstices of the fabric. This is, in many cases, extremely undesirable as it destroys the appearance of the fabric and of the article, whether the fabric be upon the outside of the article or within the same. Further, when the fabric is of knitted or elastic goods, the forcing of the rubber into the interstices interferes with the elasticity to an undesirable extent. To obviate these objections I vulcanize to a greater or less extent the composition on the fabric, either by heating to a proper extent the coated fabric before cutting it into sections, or heating the coated sections after cutting, the vulcanization being continued to such an extent as will harden the coating sufficiently to prevent the rubber from flowing into the interstices when pressure is subsequently supplied. Preferably the coating is vulcanized to the required degree and the sections of the article are then put together in the mold, with cement if necessary, together with the other portions of the shoe, and pressure is applied, and the article is heated until the vulcanization is completed.

As a result of preparing the sections from which the article is made so that the coating thereon is vulcanized and hardened sufficiently to prevent the pressure from forcing it into the interstices, I am enabled to secure a finished article in which the rubber and the fabric are firmly connected, but in which the fabric is not defaced by the presence of rubber in the interstices, or its elasticity impaired from such presence.

I claim as my invention—

1. The process of manufacturing rubber articles, which consists in vulcanizing a rubber covered fabric to the extent sufficient to prevent the rubber from being pressed into the interstices, assembling in a mold, and molding under pressure.

2. The process of manufacturing rubber articles, which consists in vulcanizing a rubber covered fabric to the extent sufficient to prevent the rubber from being pressed into the interstices, assembling in a mold, molding under pressure, and then completing the vulcanization.

3. The process of manufacturing rubber articles, which consists in vulcanizing a rubber covered fabric to the extent sufficient to prevent the rubber from being pressed into the interstices, assembling in a mold, and subjecting to pressure and heat while in the mold to mold and vulcanize the same.

4. In the manufacture of rubber shoes, first preparing shoe sections consisting each of a piece of fabric with a rubber coating in a partially vulcanized condition, then assembling said sections within a mold with other parts of the shoe, then subjecting the same to pressure, and to heat to complete the vulcanization as set forth.

5. The process herein set forth, of making rubber shoes, the same consisting in first coating a textile fabric with a vulcanizable composition, then partially vulcanizing the entire coating, then cutting the fabric into sections, assembling said sections within a mold and subjecting them to pressure and to heat to complete the vulcanization.

In testimony whereof I affix my signature in presence of two witnesses.

EDWARD C. GAVIN.

Witnesses:
  A. O. BOURN,
  H. H. BEDELL.